(12) United States Patent
Miller (10) Patent No.: US 10,255,094 B2
(45) Date of Patent: Apr. 9, 2019

(54) UTILIZING PHYSICAL SYSTEMS AND VIRTUAL SYSTEMS FOR VIRTUAL NETWORK FUNCTIONS

(71) Applicant: Genband US LLC, Plano, TX (US)

(72) Inventor: Paul Miller, Derry, NH (US)

(73) Assignee: GENBAND US LLC, Plano, TX (US)

( * ) Notice: Subject to any disclaimer, the term of this patent is extended or adjusted under 35 U.S.C. 154(b) by 105 days.

(21) Appl. No.: 15/331,519

(22) Filed: Oct. 21, 2016

(65) Prior Publication Data

US 2017/0116018 A1 Apr. 27, 2017

Related U.S. Application Data

(60) Provisional application No. 62/245,105, filed on Oct. 22, 2015.

(51) Int. Cl.
| | |
|---|---|
| G06F 9/46 | (2006.01) |
| G06F 9/455 | (2018.01) |
| H04L 12/46 | (2006.01) |
| G06F 9/50 | (2006.01) |
| H04L 12/24 | (2006.01) |
| H04L 12/26 | (2006.01) |
| H04L 12/725 | (2013.01) |

(52) U.S. Cl.
CPC ........ G06F 9/45558 (2013.01); G06F 9/5077 (2013.01); H04L 12/4641 (2013.01); H04L 41/0896 (2013.01); G06F 2009/4557 (2013.01); G06F 2009/45595 (2013.01); H04L 43/0817 (2013.01); H04L 43/16 (2013.01); H04L 45/306 (2013.01)

(58) Field of Classification Search
CPC ............... G06F 9/45558; G06F 9/5077; G06F 2009/4557; G06F 2009/45595; H04L 12/4641; H04L 41/0896; H04L 47/125; H04L 43/0817; H04L 43/16
USPC .......................................................... 718/1
See application file for complete search history.

(56) References Cited

U.S. PATENT DOCUMENTS

| | | | | |
|---|---|---|---|---|
| 9,794,160 | B1 * | 10/2017 | Felstaine | ................. H04L 43/50 |
| 9,813,335 | B2 * | 11/2017 | Felstaine | ................. H04L 45/70 |
| 9,936,047 | B2 * | 4/2018 | Adolph | ................... H04L 67/34 |
| 2005/0289365 | A1 * | 12/2005 | Bhandarkar | .......... G06F 1/3203 713/300 |
| 2009/0248846 | A1 * | 10/2009 | Cohn | .................. H04L 41/0803 709/223 |
| 2013/0152075 | A1 * | 6/2013 | Cardona | ............. G06F 9/45558 718/1 |
| 2016/0088092 | A1 * | 3/2016 | Cardona-Gonzalez | ..................... H04L 67/141 709/227 |
| 2017/0039089 | A1 * | 2/2017 | Xia | ......................... G06F 9/544 |

\* cited by examiner

*Primary Examiner* — Camquy Truong
(74) *Attorney, Agent, or Firm* — Haynes and Boone, LLP (57) ABSTRACT

A method includes provisioning a first Virtual Network Function (VNF) component on a first virtual machine, the first virtual machine being supported by a first physical computing system, provisioning a second VNF component directly on a second physical computing system, and using, within a telecommunications network, a VNF that includes both the first VNF component running on the first virtual machine and the second VNF component running directly on the second physical computing system.

18 Claims, 5 Drawing Sheets

UTILIZING PHYSICAL SYSTEMS AND VIRTUAL SYSTEMS FOR VIRTUAL NETWORK FUNCTIONS

PRIORITY INFORMATION

The present application is a non-provisional application that claims priority to provisional application No. 62/245,105 filed Oct. 22, 2015 and entitled "Utilizing Physical Systems and Virtual Systems for Virtual Network Functions," the disclosure of which is hereby incorporated by reference in its entirety.

BACKGROUND

The present disclosure relates generally to Network Functions Virtualization (NFV), and more particularly to methods and systems for NFV systems that utilize Metal as a Service (MaaS).

NFV is a concept that involves virtualization of various telecommunication functions that are then interconnected to provide telecommunication services. Particularly, specific telecommunication functions that were previously performed by specialized pieces of hardware are replaced with a virtualization of such hardware. One example of such hardware is a Session Border Controller (SBC). The virtualized functions that would otherwise be performed by such hardware are referred to as Virtual Network Functions (VNFs).

NFV can utilize various computing and networking technologies such as cloud computing and Software-Defined Networking (SDN). Cloud computing typically involves several physical computing systems that, through the use of a hypervisor, present virtual machine environments for use by guest operating systems. The guest operating systems can run applications as a physical computing system does. Applications related to VNFs can be run on such guest operating systems.

SDN is an approach to networking that separates the control plane from the data plane. By contrast, a legacy system may include several independently configured routers, whereas a system implementing SDN may include a central management component that makes decisions as to where traffic should be sent and then directs underlying systems to route network traffic as appropriate. SDN concepts can be used in the physical networks that interconnect the physical computing systems that provide a virtual machine environment.

SUMMARY

According to one example, a method includes provisioning a first Virtual Network Function (VNF) component on a first virtual machine, the first virtual machine being supported by a first physical computing system, provisioning a second VNF component directly on a second physical computing system, and using, within a telecommunications network, a VNF that includes both the first VNF component running on the first virtual machine and the second VNF component running directly on the second physical computing system.

According to one example, a method includes, with a Virtual Network Function (VNF) manager, sending a first instruction to a Network Function Virtualization Infrastructure (VNFI) to use a first virtual machine to provide a first VNF component, the first virtual machine being supported by at least one of a plurality of physical computing systems. The method further includes, with the VNF manager, sending a second instruction to the VNFI to use one of the plurality of physical computing systems to directly support a second VNF component, the first VNF component and the second VNF component both being used to provide a VNF.

According to one example, a system includes a processor and a memory comprising machine readable instructions that when executed by the processor, cause the system to: send a first instruction to a Network Function Virtualization Infrastructure (VNFI) to use a first virtual machine to provide a first Virtual Network Function (VNF) component, the first virtual machine being supported by at least one of a plurality of physical computing systems. The system is further to send a second instruction to the VNFI to use one of the plurality of physical computing systems to directly support a second VNF component and manage a VNF that uses both the first VNF component and the second VNF component.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, NFV utilizes several virtual machines in a cloud computing environment to perform telecommunication functions that were previously provided by specialized pieces of hardware. For example, a series of physical computing systems, often referred to as host systems, provide a number of virtual machines for use by guest operating systems. This is typically done through use of a hypervisor. A hypervisor is a piece of software that runs on the host system to provide virtual machines. The host systems include various hardware components such as processors and storage capabilities. Sometimes, the processors used in the host system include various design features that allow for faster processing of certain types of processing tasks. Such features are referred to as hardware accelerators.

While virtual machines provide many advantages, they add an additional layer of processing overhead. For example, when an application is run on a guest operating system, the instructions for that application are executed on virtual hardware. The hypervisor then has to map that virtual hardware to physical hardware resources. Thus, when running an application on a guest operating system, it may not be possible to utilize certain hardware accelerators that are present within the host system.

According to principles described herein, a VNF includes several components, some of which run as applications on a guest operating system within a virtual machine environment. Some components of the VNF, however, run directly on physical systems. Thus, the VNF includes components that are both run in a virtual environment and directly on physical machines. This allows some components of the VNF to utilize various hardware accelerators associated with the physical machines.

Figure 1:
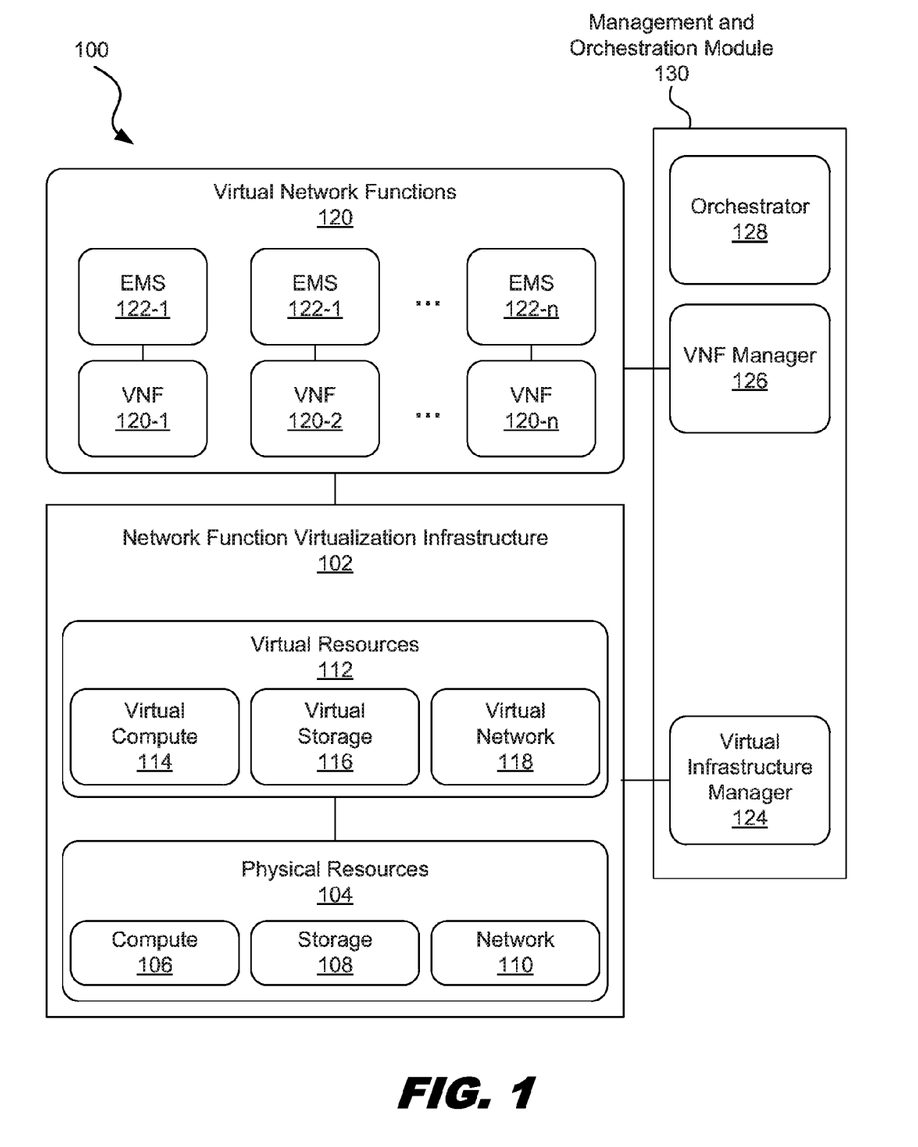
FIG. 1 is a diagram showing network function virtualization, according to one example of principles described herein.

FIG. 1 is a diagram showing network function virtualization 100. According to the present example, a Network Function Virtualization Infrastructure (NFVI) 102 is used to provide network function virtualization 100. The NFVI 102 provides the infrastructure for a number of VNFs 120. Both the VNFs 120 and the NFVI 102 are managed by a management and orchestration module 130.

The NFVI 102 includes a set of physical resources 104 that are used to provide a set of virtual resources 112. The physical resources 104 include computing resources 106, storage resources 108, and network resources 110. The physical resources 104 are typically embodied as a plurality of physical computing systems, sometimes referred to as servers, within a datacenter. For example, a datacenter may include several servers that are positioned on racks and interconnected via physical network cables. Each of the servers includes a physical processor, a memory, and a network interface. Some servers may be designed primarily for processing power and some servers may be designed primarily for storage.

The computing resources 106 include a plurality of processors within a plurality of physical computing systems. The processors are designed to process machine readable instructions to perform specifically designed tasks. The processors can be designed to work together to provide parallel processing capabilities.

The storage resources 108 include various types of memory. Some types of memory, such as non-volatile types of memory, typically have large storage volume but relatively slow performance. The storage resources 108 may include a series of hard disk drives or solid state drives that store data in the form of machine readable instructions as well as large amounts of data. The storage resources 108 may also include volatile forms of memory, such as those used for Random Access Memory (RAM), which are optimized for speed and are often referred to as "working memory."

The network resources 110 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 104 use hypervisors to provide a virtual computing environment that provides the virtual resources 112. Specifically, the hypervisors provide virtual hardware to guest operating systems. A physical computing system may provide one or more virtual machines for use by guest operating systems. The virtual resources 112 include virtual computing resources 114, virtual storage resources 116, and virtual network resources 118. Such virtual resources 112 may emulate their underlying physical resource counterparts.

The virtual computing resources 114 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 116 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

The virtual machines that are provided as part of the virtual resources 112 can be interconnected to each other through one or more virtual networks that make up the virtual networking resources 118. Such virtual networks emulate physical networks. The virtual networks can also isolate sets of virtual machines as desired. This can be helpful if some virtual machines are owned and/or operated by one entity and other virtual machines are owned and/or operated by another entity.

The NFVI 102 is managed by a virtual infrastructure manager 124, which is part of the management and orchestration module 130. The infrastructure manager 124 may include hardware, software, or a combination of both to perform various management functions. For example, the infrastructure manager 124 may be an application that resides on one or more physical machines and can receive input from human administrators as well as other management functions. The infrastructure manager 124 can then manage the physical and virtual environment as appropriate. For example, if it is determined that more virtual machines are desired, then the infrastructure manager 124 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 124 can also take such physical computing systems out of standby mode when more computing power is desired. One example of an infrastructure manager 124 includes the open-source cloud computing software platform provided by the Openstack Foundation under the name OpenStack™.

As described above, a VNF 120 represents a virtualization of specific telecommunication functions that were previously performed by specialized pieces of hardware. Examples of a VNF 120 include, but are not limited to, an SBC, an Internet Protocol (IP) Multimedia Subsystem (IMS) core, and a telephony application server. A VNF 120 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 120 has a corresponding Element Management System (EMS) 122. The EMS 122 includes a user interface, or a dashboard, that allows an administrator to configure the VNF 120 as desired. To provide full NFV, several VNFs work together to provide the desired services. In the present example, a plurality of VNFs 120-1, 120-2 . . . 120-n and corresponding EMSs 122-1, 122-2 . . . 122-n are used to provide NFV.

The VNFs 120 are managed by a VNF manager 126, which is part of the management and orchestration module 130. In some cases, there may be multiple VNF managers 126, each managing one or more specific VNFs 120. The VNF manager 126 can manage the VNFs based on network demand. For example, at peak times, the VNF manager 126 can start up new instances of VNF components to scale dynamically according to demand. While there may be several VNF managers 126, there is a single orchestrator 128 that manages the VNF managers 126 and thus manages the entire NFV service.

Figure 2:
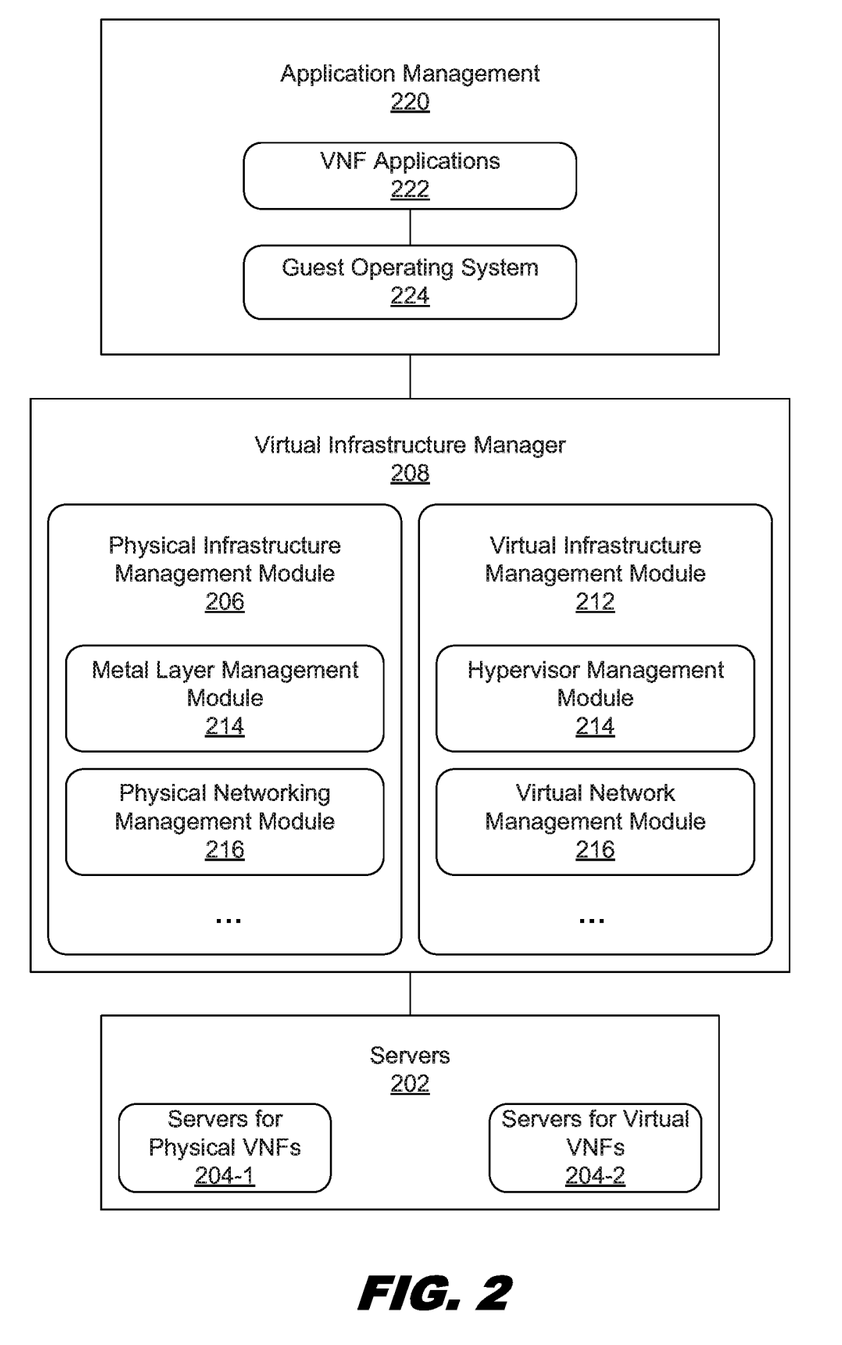
FIG. 2 is a diagram showing various components of a network function virtualization infrastructure, according to one example of principles described herein.

FIG. 2 is a diagram showing a model 200 of NFV. According to the present example, the NFV model 200 includes a plurality of physical servers 202. Some of those servers 204-1 may be used to directly support VNFs. Some of those servers 204-2 may be used to support virtual VNFs. The model 200 also includes a virtual infrastructure manager 208 and an application layer 220.

The servers 202 may include a plurality of physical computing systems acting as servers 204. An example datacenter may include thousands of servers 202. Generally, each server should be configured before it can be used. Configuring a server may involve installing an operating system, adjusting the settings of that operating system, and adjusting other settings of the physical machine as desired. A metal layer management module can remotely configure such servers in an automated manner. Thus, an administrator does not have to physically go to each of the thousands of servers in the database to configure each server 202, at least for the automated parts of configuration.

The virtual infrastructure manager 208 includes a physical infrastructure management module 206 and a virtual infrastructure management module 212.

The physical infrastructure management module 206 can provide a service referred to as Metal as a Service (MaaS). While cloud computing allows for the provisioning of virtual machines for use by various entities, MaaS allows for on demand provisioning of physical systems. For example, a customer of a MaaS provider may desire use of one or more physical systems. The MaaS then provides those systems for use by the customer. The customer can then configure those physical systems as desired and run their applications on those configured physical systems. The customer may use the physical machines to run software directly thereon or the physical machines may be configured to provide a cloud computing, or virtual machine environment in which applications are run.

To use the physical servers 204-2 to provide a virtual machine environment, the physical infrastructure management module 206 can be used. The physical infrastructure management module 206 installs the appropriate software on a server to allow it to participate in a cloud or perform other desired functions. For example, the physical infrastructure management module 206 can remotely install a host operating system as well as cloud stack software such as OpenStack on servers 202 as desired. The physical infrastructure management module 206 utilizes the metal layer management module 214 to utilize various physical servers 204. For example, if the metal layer orchestration layer 206 determines that it needs four physical servers 204 to create the desired cloud environment, then the metal layer orchestration layer 206 requests use of four servers from the metal layer management module 214. The metal layer management module 214 can then provide four available servers for use by the physical infrastructure management module 206 as desired. The physical infrastructure management module 206 also includes a physical networking management module 216 for managing physical network resources. Other services may be included in the physical infrastructure management module.

The virtual infrastructure manager 208 further includes a virtual infrastructure management module 212. The virtual infrastructure management module 212 includes a hypervisor management module 214 and a virtual network management module 216. The virtual infrastructure management module 212 can manage a cloud, or a virtual computing environment. For example, the virtual infrastructure management module 212 can configure the hypervisors running on the physical machines through use of the hypervisor management module 214. Configuration of the hypervisors may involve setting the characteristics of virtual machines to be provided by the hypervisor. Characteristics of a virtual machine may include how much memory is to be available to the guest operating system and what kind of processing throughput is to be provided to the guest operating system. The virtual infrastructure management module 212 can also set up and manage virtual networks that connect the virtual machines within the cloud through use of the virtual network management module 216. For example, the virtual network management module 216 may assign networking addresses to the virtual machines and set up virtual routers and switches configured to route packets to and from the virtual machines. The virtual infrastructure management module 212 can also manage the virtual storage associated with the cloud.

With the managed cloud in place, as established by the virtual infrastructure management module 212, an application management layer 220 manages the applications that run on the cloud. For example, the application management layer 220 includes the guest operating systems 224 that run on the virtual machines of the cloud. The application management layer 220 also manages VNF applications 222 that run within the cloud computing environment. The VNF applications provide the functionality of the network nodes in a telecommunication network that were previously provided by a specialized piece of hardware.

Figure 3:
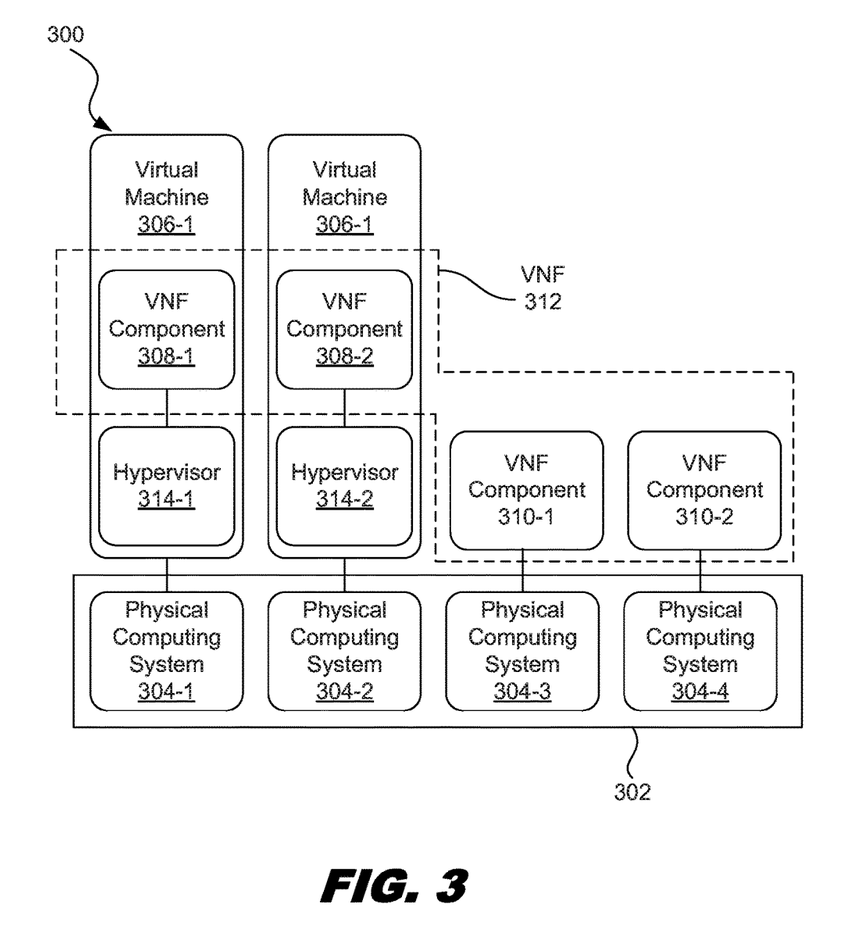
FIG. 3 is a diagram showing a virtual network function that includes both components that run on a virtual machine and components that run on a physical machine, according to one example of principles described herein.

FIG. 3 is a diagram showing a virtual network function 312 that includes components 308-1, 308-2 that run on virtual machines 306-1, 306-2 and components 310-1, 310-2 that run directly on physical machines 304-3, 304-4. A VNF 312 typically includes several different components, which may or may not be identical, that together form the full VNF 312. For example, the different components may be different instances of the VNF application. The different instances then work together to provide the functionality of the full VNF 312.

According to principles described herein, some VNF components 308-1, 308-2 run on the virtual machines 306-1, 306-2, which are supported by physical computing systems 304-1 304-2. Some VNF components 310-1, 310-2, however, run directly on physical computing systems. In other words, the VNF components 310-1, 310-2 do not run on virtual machines. Instead, the host operating systems of the physical computing systems 304-3, 304-4 cause the applications that make up the VNF components 310-1, 310-2 to be executed by the physical hardware of the physical computing systems 304-3, 304-4 without the use of a hypervisor or virtual machine. As will be described in further detail below, MaaS may be used to provision the physical computing systems 304-3, 304-4. While the virtual machines 306-1, 306-2 are illustrated as being supported by separate physical computing systems 304-1, 304-2, it may be that the virtual machines 306-1, 306-2 are supported by a single physical computing system.

In one example, each of the physical computing systems 304-1, 304-2, 304-3, and 304-4 are servers within a datacenter. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

Physical computing systems 304-1 and 304-2 are configured to support virtual machines. Thus, the applications that run on the physical computing systems 304-1, 304-2 include cloud stack software and hypervisor software. One example of such cloud stack software is the cloud computing software platform provided by the Openstack Foundation. Using the hypervisor, the physical computing systems 304-1, 304-2 support a virtual machine environment that includes a number of virtual machines 306-1, 306-2. The virtual machines 306-1, 306-2 represent an emulation of physical hardware that is then provided for use by a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines 306-1, 306-2. In the present example, the guest operating system provides the VNF components 308-1, 308-2 with access to the virtual hardware of the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor uses a translates a virtual memory address into a physical memory address and the data is stored at that physical memory address. When the guest operating system schedules processing tasks for execution on the virtual processor, the hypervisor translates those processing tasks into executable instructions for the physical processor.

The other physical computing systems 304-3, 304-4 are configured to directly support the other VNF components 310-1, 310-2 and may not be configured to support a virtual machine environment. For example, the physical computing systems 304-3, 304-4 have an operating system such as Linux and the VNF component applications are installed thereon. Thus, the host operating system of the physical computing systems 304-3, 304-4 provides the applications that make up the VNF components 310-1, 310-2 with direct access to the physical hardware resources. There is no virtual machine or hypervisor between the applications and physical hardware resources in such case. Thus, the host operating system of the physical computing systems 304-3, 304-4 does not provide the VNF components with access to virtual resources like the guest operating system described above. Each of the VNF components 308-1, 308-2, 310-1, 310-2 then work together to provide the full VNF 312.

Figure 4:
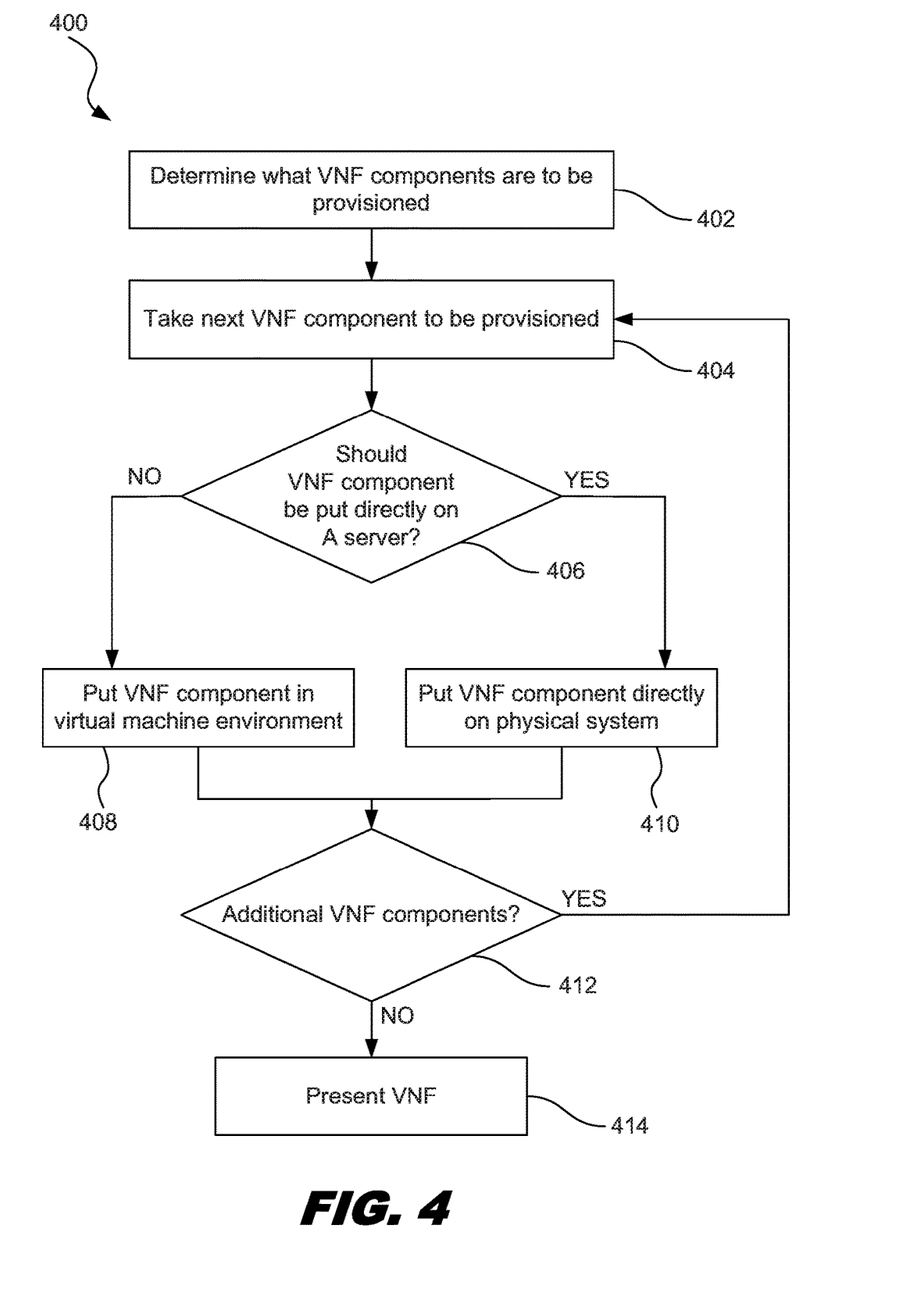
FIG. 4 is a flowchart showing an illustrative method for determining which components go on which type of machine, according to one example of principles described herein.

FIG. 4 is a flowchart showing an illustrative method for allocating VNF components between physical and virtual machines. The method 400 may be performed, for example, by a VNF manager (e.g. 126, FIG. 1). While in some cases, it may be useful to have a VNF component deployed in a virtual machine environment, there may be cases where it is useful to have some or all of the VNF components deployed directly on physical machines. Various factors can be considered when determining whether a VNF component should be deployed on a virtual machine or on a physical machine.

The method 400 includes a step 402 for determining what VNF components are to be provisioned. For example, when first starting up a VNF, a certain number of instances are provisioned. This number, however, may change during operation of the VNF as demand for services changes. The method 400 then proceeds through each of VNF components to be provisioned and takes the next VNF to be provisioned in step 404.

At step 406, it is determined whether the VNF component is to be put directly on a server. In other words, it is determined that the VNF component is to either be put directly on a physical system or on a virtual machine. If it is determined that the VNF component is to be put in a virtual environment, then the method proceeds to step 408 at which the VNF is put in the virtual machine environment. If it is determined that the VNF component is to be put directly on a physical computing system, then the method proceeds to step 410 at which the VNF is put directly on the physical computing system.

As mentioned above, various factors can be used to consider whether a VNF component is to be deployed on a virtual machine or directly on a physical computing system. One such factor is whether the VNF component could benefit from utilizing certain hardware accelerators. Physical computing systems may include certain processors and corresponding drivers that have specific features that allow the processors to perform certain processing tasks substantially more efficiently. For example, a specially designed processor may have the ability to process digital signals far more efficiently than a standard processor. Such features are often referred to as hardware accelerators. A particular VNF component may involve machine readable instructions that could be performed much more efficiently using the hardware accelerators. Because of the overhead of using a virtual machine, and the way in which a hypervisor maps instructions executed by the virtual machine to the underlying physical processor, it may not be possible to utilize such hardware accelerators when the VNF component is placed in a virtual machine environment.

Some examples of hardware accelerators include data plane accelerators such as Data Plane Development Kit (DPDK) and media accelerators such as Media Software Development Kit (MSDK). Faster packet processing can be beneficial for VNF components that are associated with Internet Protocol (IP) based telecommunication services. In a specialized piece of hardware, the packet processing functionality may have utilized a separate processor designed specifically with data packet processing technology. But, the physical computing systems running the virtual machines, or running the VNF components directly, may include processors that have the data packet processing technology integrated within the main processors. DSPK is a technology that allows for faster digital signal processing. Such processing is common for use by VNF components. Again, a specialized piece of hardware may use a special processor for digital signal processing. But, the physical computing systems running the virtual machines, or running the VNF components directly, may include processors that have the digital signal processing technology integrated within the main processors. When the VNF component is run directly on a physical computing system, it can more efficiently take advantage of these hardware accelerators. In some examples, it is known beforehand which components benefit from being allocated to a physical machine. Thus, a VNF manager may utilize a database or other data structure that matches various VNF components by identity or type to a status, where the status indicates whether such component may or may not benefit from being allocated to a physical machine. Step 406 may include comparing an identity or type of the VNF component to be provisioned with the data in the data structure and performing the determination of step 406 based thereon.

After the VNF component has been deployed in its appropriate space, the method proceeds to step 412, at which it is determined if there are any additional VNF components to be deployed. If there are additional VNF components to be deployed, then the method returns to step 404. If, however, there are no VNF components left to be deployed, the method proceeds to step 414, at which the full VNF is provided. During operation of the full VNF, it may be determined that more or fewer VNF components are needed. The VNF manager (e.g. 126, FIG. 1) can then provision new VNF components. The VNG manager may also tear down existing VNF components.

Figure 5:
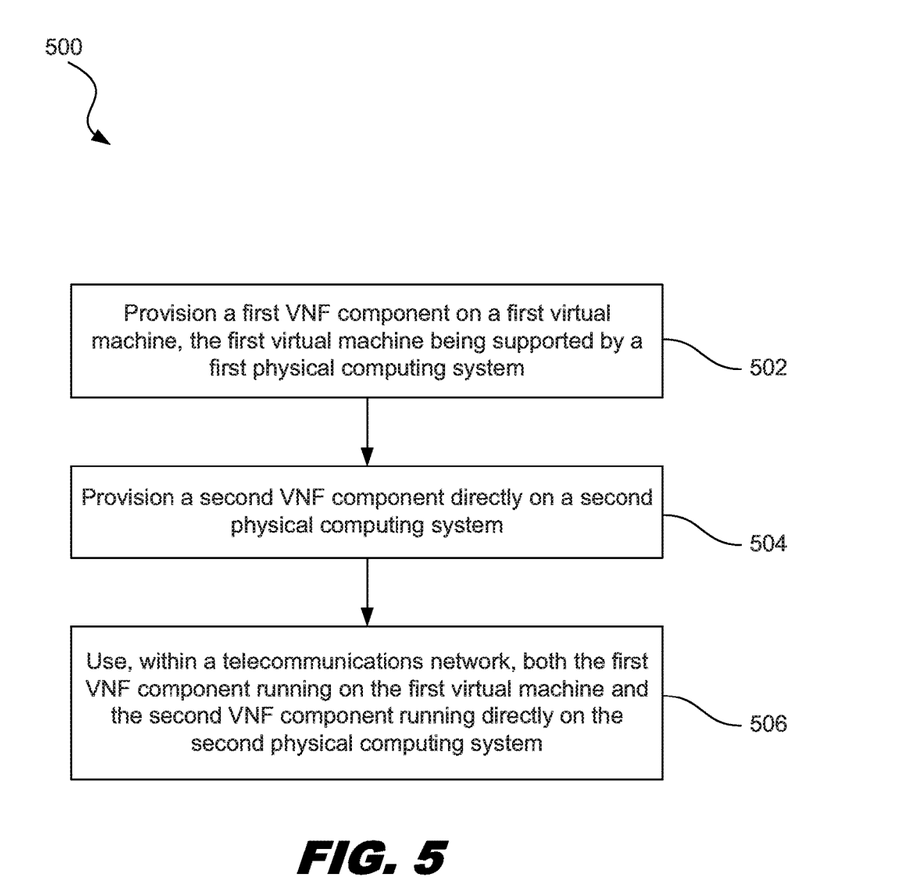
FIG. 5 is a flowchart showing an illustrative method for providing a virtual network function that has components that run on a virtual machine and components that run on a physical machine, according to one example of principles described herein.

FIG. 5 is a flowchart showing an illustrative method for using a virtual network function that has components that run on a virtual machine and components that run on a physical machine. According to the present example, the method 500 includes a step 502 for provisioning a first Virtual Network Function (VNF) component on a first virtual machine, the first virtual machine being supported by a first physical computing system. The provisioning of the first VNF component may be initiated by the VNF manager (e.g. 126. FIG. 1).

In one example, the VNF manager associated with the VNF to be provided sends a first instruction to the infrastructure manager (e.g. 124, FIG. 1) that manages the NFVI (e.g., 102, FIG. 1). The first instruction causes the first VNF component to be loaded onto a virtual machine within the NFVI. In some cases, if no virtual machines are currently available for the VNF component, the infrastructure manager can spin up the appropriate hardware and software to create the virtual machine for use by the first VNF component. Using the principles described above, the first virtual machine is supported by one or more physical computing systems that have been configured for providing virtual machines. Specifically, such physical computing systems may have hypervisors and other cloud management software installed thereon.

The method 500 further includes a step 504 for provisioning a second VNF component directly on a second physical computing system. The provisioning of the second VNF component may be initiated by the VNF manager 126. In one example, the VNF manager sends a second instruction to the infrastructure manager. The second instruction causes the NFVI to provide a physical computing system for use by the second VNF components. For example, using the principles described above, related to MaaS, one of the physical computing systems within a datacenter can be provided for use by the second VNF component. The second VNF component runs directly on the physical computing system. Thus, the physical computing system is configured to support the second VNF directly. In other words, a standard operating system can be installed on the physical computing system and the physical computing system may not have a hypervisor or cloud stack software installed thereon. During operation of the VNF, the VNF manager can determine that more or fewer physical computing systems that directly support VNF components should be used. Thus, the VNF manager can cause the NFVI to requisition more physical computing systems to directly support VNF components. The VNF manager can also cause the NFVI to release physical systems that are no longer needed.

The VNF manager determines whether a particular VNF component is to be provisioned on a virtual machine or provisioned directly on a physical machine. For example, using the criteria described above in the text accompanying FIG. 4, the VNF manager determines whether a particular instance can benefit from being placed on a physical machine. In some examples, however, such a determination regarding which type of machine a VNF component should be provisioned is predetermined. For example, the VNF component may have metadata that can be viewed by the VNF manager to determine whether it should be placed on a physical machine. The VNF manager may also utilize a database that identifies VNF components as being for virtual machine or physical machine provisioning.

The method 500 further includes a step 506 for using, within a telecommunications network, a VNF that includes both the first VNF component running on the first virtual machine and the second VNF component running directly on the second physical computing system. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF provides such functions instead of a specialized piece of hardware.

For example, the VNF may emulate an SBC. For the various components that make up that SBC, some may be running on virtual machines, and some may be running directly on physical computing systems. This provides a number of advantages. Specifically, the VNF components that are capable of benefiting from hardware accelerators can use those accelerators appropriately. Because such VNF components are more efficient when run directly on physical computing systems, fewer VNF components may be used to provide the full VNF. Additionally, the VNF components that do not necessarily benefit from running directly on a physical machine can still run on virtual machines. Such VNF components can thus take advantage of the benefits of running on a virtual machine.

Some examples of processing systems described herein may include non-transitory, tangible, machine readable media that include executable code that when run by one or more processors may cause the one or more processors to perform the processes of methods 400, 500 as described above. Some common forms of machine readable media that may include the processes of methods 400, 500 are, for example, floppy disk, flexible disk, hard disk, magnetic tape, any other magnetic medium, CD-ROM ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
provisioning a first Virtual Network Function (VNF) component on a first virtual machine, the first virtual machine being supported by a first physical computing system;
provisioning a second VNF component directly on a second physical computing system without running on a virtual machine;
using, within a telecommunications network, a VNF that includes both the first VNF component running on the first virtual machine and the second VNF component running directly on the second physical computing system;
with a VNF manager, determining that a third VNF component should be provisioned;
with the VNF manager, determining whether the third VNF component is capable of utilizing a hardware accelerator associated with a third physical computing system; and
in response to determining that the third VNF component does not require use of the hardware accelerator, implementing the third VNF on the at least one virtual machine.

2. The method of claim 1, wherein the second VNF component comprises functions associated with a hardware accelerator.

3. The method of claim 2, wherein the second physical computing system comprises the hardware accelerator, the hardware accelerator comprising one of: packet plane acceleration and media acceleration.

4. The method of claim 1, wherein the second VNF component may be allocated or de-allocated dynamically.

5. The method of claim 1, further comprising:
with a VNF manager, determining that a fourth VNF component should be provisioned;
with the VNF manager, determining whether the fourth VNF component is capable of utilizing a hardware accelerator associated with a third physical computing system.

6. The method of claim 5, further comprising, in response to determining that the fourth component is capable of utilizing the hardware accelerator, implementing the third VNF component directly on the third physical computing system.

7. The method of claim 1, further comprising, in response to determining that the second VNF component will have improved performance without use of a hypervisor, implementing the second VNF component directly on the second physical computing system.

8. The method of claim 1, wherein the VNF comprises a virtualization of one of: a Session Border Controller (SBC), an Internet Protocol (IP) Multimedia Subsystem (IMS) network function, and a telephony application server network function.

9. The method of claim 1, further comprising, through use of a database that includes information about VNF components, determining whether a third VNF is to be provisioned on either a virtual machine or directly on a physical machine.

10. The method of claim 9, wherein the one of the plurality of physical computing systems to directly support the second VNF component is provisioned using Metal as a Service (MaaS).

11. The method of claim 9, wherein the second VNF component comprises functions associated with a hardware accelerator.

12. The system of claim 1, wherein the system is further to determine that a third VNF component is to be deployed on either a second virtual machine or one of the plurality of physical computing systems.

13. The system of claim 1, sending a third instruction to the VNFI to implement the third VNF component on either the second virtual machine or the one of the plurality of physical computing systems.

14. A method comprising,
with a Virtual Network Function (VNF) manager, sending a first instruction to a Network Function Virtualization Infrastructure (NFVI) to use a first virtual machine to provide a first VNF component, the first virtual machine being supported by at least one of a plurality of physical computing systems;
with the VNF manager, sending a second instruction to the VNFI to use one of the plurality of physical computing systems to directly support a second VNF component without running on a virtual machine, the first VNF component and the second VNF component both being used to provide a VNF;
in response to a change in demand for the VNF, determining that a third VNF component should be provisioned;
with the VNF manager, determining whether the third VNF component is capable of utilizing a hardware accelerator associated with the plurality of physical computing systems; and
in response to determining that the third VNF component does not require use of the hardware accelerator, instructing the NFVI to implement the third VNF on a second virtual machine supported by at least one of the plurality of physical computing systems.

15. The method of claim 14, further comprising:
in response to a change in demand for the VNF, determining that a fourth VNF component should be provisioned;
with the VNF manager, determining whether the fourth VNF component is capable of utilizing a hardware accelerator associated with the plurality of physical computing systems; and
in response to determining that the third VNF component is capable of utilizing the hardware accelerator, instructing the NFVI to implement the third VNF directly on an available one of the plurality of physical computing systems.

16. The method of claim 15, wherein the second physical computing system comprises the hardware accelerator.

17. The method of claim 14, further comprising:
in response to a change in demand for the VNF, determining that a third VNF component should be provisioned; and
in response to determining that the third VNF component will have improved performance without use of a hypervisor, implementing the third VNF component directly on the third physical computing system.

18. A system comprising:
a processor; and
a memory comprising machine readable instructions that when executed by the processor, cause the system to:
send a first instruction to a Network Function Virtualization Infrastructure (VNFI) to use a first set of virtual machines to provide a first set of Virtual Network Function (VNF) components, the first set of virtual machines being supported by at least one of a plurality of physical computing systems;
send a second instruction to the VNFI to use one of the plurality of physical computing systems to directly support a set of second VNF components without a virtual machine; and
manage a VNF that uses both the first set of VNF components and the second set of VNF components; and
in response to determining that a new VNF component does not require use of the hardware accelerator, instructing the NFVI to implement the new VNF on one of the plurality of physical computing systems.

* * * * *